United States Patent Office 3,480,585
Patented Nov. 25, 1969

3,480,585
POLYCARBONATE RESINS
Everett E. Gilbert, Morris Township, Morris County, Bryce C. Oxenrider, Florham Park, and George J. Schmitt, Madison, N.J., assignors to Allied Chemical Corporation, New York, N.Y., a corporation of New York
No Drawing. Filed Mar. 31, 1965, Ser. No. 444,408
Int. Cl. C08g 17/13
U.S. Cl. 260—47         2 Claims

ABSTRACT OF THE DISCLOSURE

Polycarbonate resins of enhanced thermal stability can be prepared by reacting phosgene with 2,2-bis (4'-hydroxyphenyl) - 1,1a,3,3a,4,5,5,5a,5b,6 - decachlorooctahydro-1,3,4-mentheno-2H-cyclobuta[c,d]pentalene, and its methyl and ethyl derivatives.

This invention relates to new and useful polycarbonate resins and, more particularly, refers to polycarbonate resins derived from 2,2-bis(4'-hydroxyphenyl)-1,1a,3,3a, 4,5,5,5a,5b,6-decachlorooctahydro - 1,3,4 - metheno-2H-cyclobuta [cd]pentalene, its methylated and ethylated derivatives and to processes for their preparation.

Heretofore, polycarbonate resins have been prepared by reacting a carbonic acid derivative such as phosgene with dihydroxymonoaryl compounds, such as hydroquinone and resorcinol or, of more commercial importance dihydroxyaryl alkane derivatives such as 2,2-bis(p-hydroxyphenyl)propane, i.e., Bisphenol A, and bis-(p-hydroxyphenyl)methane, i.e., Bisphenol F. Such polycarbonate resins have been the subject of commercial exploitation since these resins have been found to be eminently useful due to their high thermal stability. More specifically, the polycarbonate resins of the present invention may successfully be employed in the form of films, fibers, coatings and shaped articles which are subject to elevated temperatures, as particularly illustrated in the electrical field wherein they may be advantageously employed as coatings for electrical wiring, housings and other various components. As may readily be appreciated, polycarbonates, in general, are limited by the degree of thermal stability which they inherently possess. For example, commercial products such as the aforementioned Bisphenol A and Bisphenol F polycarbonates may be employed wherein environmental temperatures do not exceed about 150° C. The polycarbonates of the present invention, on the other hand, have been found to possess outstanding and unexpected thermal stability when exposed to temperatures in excess of 300° C. This unexpected and outstanding thermal property affords to the subject polycarbonates an area of industrial application which heretofore has remained closed to conventional polycarbonate resins.

Accordingly, it is a principal object of the present invention to provide new polycarbonate resins derived from 2,2 - bis(4'-hydroxyphenyl) - 1,1a,3,3a,4,5,5,5a,5b,6-decachlorooctahydro - 1,3,4-metheno - 2H - cyclobuta [cd] pentalene and its derivatives. It is a further object of the present invention to provide processes for the preparation of these new polycarbonate resins. Other objects and advantages will be apparent from the following description.

In accordance with the present invention, polycarbonate resins composed of the recurring units of the structural formula

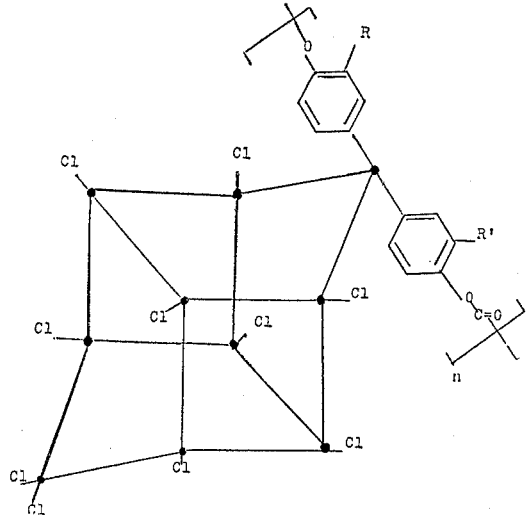

wherein each node represents a tetravalent carbon atom, n is an integer of from 5 to 200, R and R' are members of the group independently selected from hydrogen, methyl and ethyl can be prepared by reacting a bisphenol having the structural formula

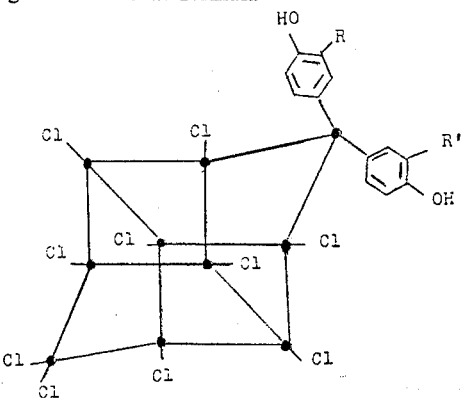

wherein R and R' are members independently selected from the group consisting of hydrogen, methyl and ethyl, with phosgene in a basic medium and thereafter recovering the resulting 2,2 - bis(4'-hydroxyphenyl) - 1,1a,3,3a, 4,5,5,5a,5b,6 - decachlorooctahydro - 1,3,4 - metheno-2H-cyclobuta [cd] pentalene polycarbonate resin from the reaction mixture.

2,2 - bis(4' - hydroxyphenyl)-1,1a,3,3a,4,5,5,5a,5b,6-decachlorooctahydro - 1,3,4 - metheno - 2H-cyclobuta [cd] pentalene, 2,2 - bis(4'-hydroxy-3'-methylphenyl)-1,1a,3,3a,4,5,5,5a,5b,6 - decachlorooctahydro-1,3,4-metheno - 2H - cyclobuta [cd] pentalene and 2,2-bis(4'-hydroxy - 3'-ethylphenyl)-1,1a,3,3a,4,5,5,5a,5b,6-decachlorooctahydro - 1,3,4 - metheno - 2H - cyclobuta [cd] pentalene, hereinafter simply referred to as DCMP bisphenols, are white crystalline solids. These bisphenols and the processes for their preparation are disclosed and claimed in co-pending application of E. E. Gilbert et al., Ser. No. 435,723, filed Feb. 26, 1965, now U.S. Patent No. 3,370,086, granted Feb. 20, 1968.

The polycarbonates of this invention can be prepared by solution polymerization wherein the DCMP bisphenol is reacted with phosgene in a substantially anhydrous basic medium in the presence of an inert organic solvent for the resulting polycarbonate. Alternatively, in a preferred procedure, the polycarbonates can be prepared by emulsion polymerization wherein the DCMP bisphenol is phosgenated by emulsion polymerization in an aqueous basic medium in the presence of an inert water-immiscible organic solvent for the resulting polycarbonate.

The ratio of phosgene to DCMP bisphenol is not critical and, theoretically, an equivalent molar proportion of phosgene to DCMP bisphenol is required for complete conversion to polycarbonate. However, to compensate for loss of phosgene by side reactions, 1.1 to 1.7 mols of phosgene per mol of DCMP bisphenol are preferably employed. Use of more than about 2 mols of phosgene per mol of DCMP bisphenol tends to promote side reactions which decrease process efficiency and produce polycarbonates of lower quality. If less than 1 mol of phosgene per mol of DCMP bisphenol is used, correspondingly less of the bisphenol is converted to polycarbonate. In order to obtain economical yields at least 0.5 mol of phosgene per mol of bisphenol is employed.

In solution polymerization the substantially anhydrous basic medium preferably comprises a tertiary amine such as tributyl amine, triethyl amine, pyridine, or $\alpha$-picoline. In emulsion polymerization, the aqueous basic medium preferably comprises an aqueous solution of an alkali metal hydroxide such as sodium, potassium, or lithium hydroxide. A slight excess of the basic material is desirably employed in either case.

An inert organic solvent for the polycarbonate should be present in the basic medium for both the solution polymerization and the emulsion polymerization. If an organic solvent is not used, only low molecular weight polycarbonate is produced which precipitates out of solution substantially as it is formed. The organic solvent should be a liquid, substantially inert under the conditions of reaction and, in the case of the emulsion polymerization, be immiscible with water. Suitable solvents include trichloroethylene, methylene chloride, chloroform, ethylene chloride, chlorobenzene and mixtures of these chlorine-containing solvents with benzene. The amount of solvent may vary over a wide range but, in general, satisfactory results are obtained using 1 to 20 parts by weight of solvent per part by weight of polycarbonate formed.

In emulsion polymerization an onium catalyst is added to assure highest yields. Suitable catalyst include the halides and hydroxides of ammonium, phosphonium and arsonium radicals. The general formula for the onium catalyst employed in present invention is:

$$[R_1R_2R_3R_4M]^+X^-$$

wherein M is a member selected from the group consisting of nitrogen, phosphorus and arsenic, $R_1$, $R_2$, $R_3$ and $R_4$ are members independently selected from the group consisting of alkyl, alkenyl, aryl and aralkyl and X is a member of the group consisting of hydroxy and halogen. The alkyl and alkenyl members of the group may contain from 1 to 4 and from 2 to 5 carbon atoms, respectively. The hydrocarbon chains may be branched or unbranched. Illustrative examples of suitable catalysts are as follows:

trimethylbenzylammonium chloride,
trimethylbenzylammonium hydroxide,
tripropylbenzylammonium iodide,
tetraphenylarsonium chloride,
tetraphenylphosphonium bromide,
tri(isobutyl)benzylarsonium chloride,
dimethyldibenzylphosphonium hydroxide,
tetrabutylphosphonium bromide,
triethylbenzylarsonium hydroxide,
benzyltriethylammonium chloride,
mixtures thereof, and the like.

The weight ratio of DCMP bisphenol to the onium catalyst may vary over a wide range, i.e., 10:1 to 100:1, and, in preferred operation, weight ratios of about 40:1 to 60:1 are employed. The onium catalyst may be added prior or during the phosgene addition. When the onium catalyst is introduced after partial phosgenation, additional alkali may be added.

The temperature of the reaction may vary within a wide range, that is, it may be carried out at room temperature or at lower or higher temperatures, as desired. It is preferred, however, that a temperature range from about 0° to 100° C. be maintained throughout the reaction.

It is believed that if the reaction is conducted under atmospheric conditions using either solution or emulsion polymerization procedure, some oxidation of the reactants may occur resulting in lowered yields and excessive discoloration of the polycarbonate. Thus, in preferred operation, an inert atmosphere is provided during reaction by blanketing the reaction system with an inert gas such as nitrogen, argon, or carbon monoxide.

Upon completion of the reaction, the reaction mixture is acidified with a mineral acid such as hydrochloric acid. The polycarbonate can then be recovered from solution by conventional means such as distillation off of the solvent or precipitation of the polycarbonate by addition to a nonsolvent such as heptane, or acetone. When an emulsion polymerization procedure is used, the organic solvent phase should be separated from the aqueous phase prior to recovery of the polycarbonate.

The following examples are given for the purpose of illustrating the invention and it is to be understood that the invention is not to be limited in any way by details described therein. In the examples, parts are by weight, except where specifically designated as parts by volume, in which case parts by volume is related to parts by weight as a liter is related to a kilogram.

Example 1

21 parts of 2,2-bis(4'-hydroxyphenyl)-1,1a,3,3a,4,5,5,5a,5b,6-decachlorooctahydro-1,3,4-metheno - 2H - cyclobuta [cd] pentalene were dissolved in a solution comprised of 4 parts sodium hydroxide and 200 parts by volume of deionized water. The resulting mixture was then blanketed by an atmosphere of nitrogen. A water immiscible organic solvent comprised of 70 parts by volume ethylene dichloride and 130 parts by volume of benzene was added to the reaction mixture. The mixture was then agitated so as to create an emulsion thereof and phosgene, in gaseous form, slowly introduced into the reaction mixture until the pH of the reaction system decreased to about 6. The addition of phosgene was carried out over a period of 1.5 hours and the reaction temperature was maintained within a range of 30° to 35° C. Thereafter, 2 parts by volume of a 10% by weight aqueous solution of benzyltriethylammonium chloride and 1.3 parts of additional sodium hydroxide were added and the reaction mixture agitated for an additional period of 3 hours. Once again, phosgene was slowly introduced into the reaction mixture while maintaining a reaction temperature of about 30° C. until the mixture evidenced a marked increase in viscosity. An additional 1 part of sodium hydroxide in the form of a 10% by weight aqueous solution was added and the reaction mixture agitated for an additional period of 15 minutes. Concentrated hydrochloric acid was then added in order to reduce the pH of the reaction mixture to about 2. The reaction mixture was allowed to stand so as to effect gravitational separation of the aqueous and organic phases. When separation was completed, the organic layer was separated and washed with water until water washings exhibited a pH of about 6. Crude 2,2-bis-(4'-hydroxyphenyl) - 1,1a,3,3a,4,5,5,5a,5b,6 - decachlorooctahydro - 1,3,4 - metheno - 2H-cyclobuta [cd] pentalene polycarbonate resin was precipitated out of solution by adding the organic phase to about 1500 parts by volume of rapidly agitated heptane, a non-solvent. 17.5 parts of 2,2-bis(4'-hydroxyphenyl) - 1,1a,3,3a,4,5,5,5a,5b,6 - decachlorooctahydro - 1,3,4 - metheno - 2H - cyclobuta [cd] pentalene polycarbonate having an inherent viscosity in trichloroethylene of 0.19 were obtained and isolated by filtration.

Example 2

33 parts of 2,2-bis(4'-hydroxyphenyl)-1,1a,3,3a,4,5,5,5a,5b,6-decachlorooctahydro-1,3,4-metheno - 2H - cyclobuta [cd] pentalene were dissolved in a solution comprised of 3.9 parts sodium hydroxide and 200 parts by volume of deionized water. The resulting solution was then blanketed by an atmosphere of nitrogen. About 200 parts by volume of trichloroethylene were added to the reaction mixture, followed by agitation of both the aqueous and organic phase so as to create an emulsion thereof. Phosgene was slowly introduced into the reaction mixture until the pH of the system decreased to about 6. During the phosgene addition, the reaction temperature was maintained at about 20° C. by external cooling. Six parts by volume of a 10% by weight aqueous solution of benzyltriethylammonium chloride were then added followed by an additional amount of sodium hydroxide, sufficient to increase the pH of the reaction mixture to about 11. The reaction mixture was agitated for an additional hour whereupon 0.05 part of tetrabutylphosphonium bromide was added. Phosgene was slowly introduced until the reaction mixture evidenced a marked increase in viscosity. Concentrated hydrochloric acid was added to decrease the pH of the reaction mixture below 6, and the mixture was allowed to stand in order to effect gravitational separation of the aqueous and organic phase. The organic phase containing 2,2-bis(4'-hydroxyphenyl) - 1,1a,3,3a,4,5,5,5a, 5b,6-decachlorooctahydro-1,3,4-metheno - 2H - cyclobuta [cd] pentalene polycarbonate resin was separated, water washed and poured into 2000 parts by volume of acetone, a non-solvent, in order to effect precipitation of the resin. 27.8 parts of 2,2-bis(4'-hydroxyphenyl)-1,1a,3,3a,4,5,5, 5a,5b,6-decachlorooctahydro-1,3,4-metheno - 2H - cyclobuta [cd] pentalene polycarbonate, having an inherent viscosity in trichloroethylene of 0.20 and exhibiting no flow up to 360° C., were obtained and finally isolated by filtration.

The polycarbonate resins so produced possessed outstanding thermal stability properties. For example, films of 2,2-bis(4'-hydroxyphenyl)-1,1a,3,3a,4,5,5,5a,5b,6-decachlorooctahydro-1,3,4-metheno-2H-cyclobuta [cd] pentalene polycarbonate were found to retain 50% of their tensile strength at temperatures in excess of 300° C. The polymer had a glass transition temperature of 310° C. the glass transition temperature is a second order temperature which can be determined by plotting the apparent modulus of rigidity of a sample as a function of temperature and can be defined as the temperature at which the apparent modulus of rigidity of the sample possesses a value of $1.45 \times 10^4$ p.s.i. The apparent modulus of rigidity can be determined in accordance with ASTM D–1043. Moreover, infrared spectra showed characteristic absorption peaks, in microns, at 3.15 to 3.25; 5.55 to 5.65; 6.2 and 6.6; 8.0 to 8.6; 9.45 and 9.80; 11.75 to 12.25; 12.7, 13.1 and 15.25.

Cast films of 2,2-bis(4'-hydroxyphenyl)-1,1a,3,3a,4,5, 5,5a,5b,6-decachlorooctahydro - 1,3,4-metheno-2H-cyclobuta [cd] pentalene polycarbonate resin, obtained by spreading solutions of the resin in trichloroethylene on glass plates, followed by evaporation off of the solvent, showed ultimate elongation of 10%, an ultimate tensile strength of 7200 p.s.i. and a 2% secant modulus of 187,000 p.s.i. (ASTM D–638 and D–412).

Example 3

33 parts of 2,2-bis((4'-hydroxyphenyl)-1,1a,3,3a,4,5,5, 5a,5b,6-decachlorooctahydro - 1,3,4 - metheno-2H-cyclobuta [cd] pentalene were dissolved in about 300 parts by volume of pyridine. The resulting reaction mixture was agitated to effect homogeneity and phosgene introduced at a temperature of from about 26° to 29° C. for a period of 1.5 hours. At the end of this time, the reaction mixture was poured into about 1000 parts by volume of acetone whereupon a white solid formed and precipitated out of solution. The supernatant liquid was then decanted and an additional 1000 parts by volume of acetone was added followed by filtration and washing with isopropyl alcohol. 26.1 parts of 2,2-bis(4'-hydroxyphenyl)-1,1a,3,3a,4,5,5,5, 5a,5b,6-decachlorooctahydro - 1,3,4 - metheno-2H-cyclobuta [cd] pentalene polycarbonate were recovered.

Example 4

33 parts of 2,2-bis(4'-hydroxyphenyl)-1,1a,3,3a,4,5,5, 5a,5b,6-decachlorooctahydro - 1,3,4 - metheno-2H-cyclobuta [cd] pentalene were dissolved in a solution comprised of 8.4 parts of potassium hydroxide and 250 parts by volume of deionized water. The resulting mixture was then blanketed by an atmosphere of nitrogen. 250 parts by volume of ethylene dichloride were added to the reaction mixture. The mixture was then agitated so as to create an emulsion thereof and phosgene, in gaseous form, slowly introduced into the reaction mixture until the pH of the reaction system decreased to about 9.5. The addition of phosgene was carried out over a period of about 24 minutes and the reaction temperature was maintained at about 20° C. Thereafter, 1.2 parts by volume of a 10% by weight aqueous solution of benzyltriethylammonium chloride, 6 parts of additional potassium hydroxide in 100 parts by volume of deionized water were added and the reaction mixture agitated for an additional period of about 30 minutes, while maintaining a reaction temperature within a range of 18° and 21° C. until the mixture evidenced a marked increase in viscosity. Concentrated hydrochloric acid was then added in order to reduce the pH of the reaction mixture to about 1.5 and the reaction mixture agitated for a period of 15 minutes. The reaction mixture was allowed to stand so as to effect gravitational separation of the aqueous and organic phases. When separation was completed, the organic layer was separated and washed with water. Crude 2,2-bis(4'-hydroxyphenyl)-1,1a,3,3a,4, 5,5,5a,5b,6 - decachlorooctahydro - 1,3,4 - metheno-2H-cyclobuta [cd] pentalene polycarbonate resin was precipitated out of solution by adding the organic phase to about 1000 parts by volume of rapidly agitated heptane, a non-solvent. 29.6 parts of 2,2-bis(4'-hydroxyphenyl)-1, 1a,3,3a,4,5,5,5a,5b,6-decachlorooctahydro - 1,3,4 - metheno-2H-cyclobuta [cd] pentalene polycarbonate having an inherent viscosity in trichloroethylene of 0.19 were obtained and isolated by filtration. The polycarbonate so produced was flame-resistant, had a flow point in excess of 360° C. and a number average molecular weight of about 11,000 to 13,000.

This invention may be embodied in other forms or carried out in other ways without departing from the spirit or essential characteristics thereof. The present embodiment is, therefore, to be considered in all respects as illustrative and not restrictive, the scope of the invention being indicated by the appended claims.

We claim:
1. A polycarbonate resin consisting essentially of recurring units of the structure:

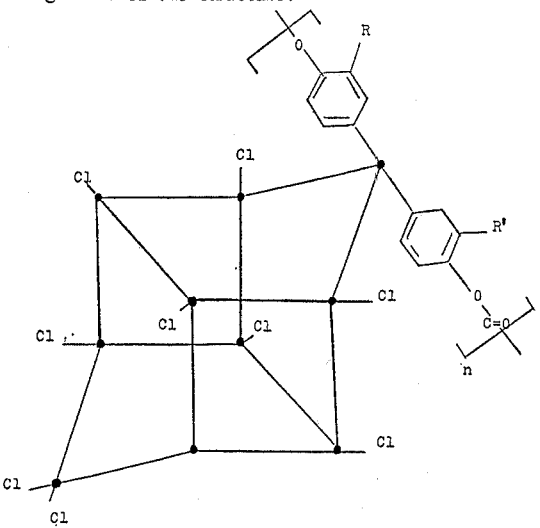

wherein R and R' are substituents independently selected from the group consisting of hydrogen, methyl and ethyl and wherein $n$ is an integer ranging from about 5 to about 200.

2. A polycarbonate resin in accordance with claim 1 wherein R and R' are hydrogen.

References Cited

UNITED STATES PATENTS

| | | | |
|---|---|---|---|
| 3,227,681 | 1/1966 | Conix | 260—47 |
| 3,248,364 | 4/1966 | Jackson et al. | 260—47 |
| 3,317,466 | 5/1967 | Caldwell et al. | 260—47 |
| 3,320,210 | 5/1967 | Caldwell et al. | 260—47 |
| 3,370,086 | 2/1968 | Gilbert et al. | 260—47 |

SAMUEL H. BLECH, Primary Examiner

U.S. Cl. X.R.

260—33.8, 619